(12) United States Patent
Uozumi (10) Patent No.: US 7,550,219 B2
(45) Date of Patent: Jun. 23, 2009

(54) FUEL SUPPLY APPARATUS FOR FUEL CELL

(75) Inventor: Tetsuo Uozumi, Kanagawa-ken (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 797 days.

(21) Appl. No.: 10/510,103

(22) PCT Filed: Oct. 9, 2003

(86) PCT No.: PCT/JP03/12973

§ 371 (c)(1),
(2), (4) Date: Oct. 5, 2004

(87) PCT Pub. No.: WO2004/038838

PCT Pub. Date: May 6, 2004

(65) Prior Publication Data

US 2005/0130008 A1    Jun. 16, 2005

(30) Foreign Application Priority Data

Oct. 22, 2002    (JP) .............................. 2002-306852

(51) Int. Cl.
*H01M 2/00* (2006.01)
*H01M 2/14* (2006.01)
*H01M 8/04* (2006.01)
*G05D 11/00* (2006.01)

(52) U.S. Cl. ............................ 429/34; 429/22; 429/24; 429/38; 137/111; 137/114

(58) Field of Classification Search .................. 429/34, 429/24, 22, 38
See application file for complete search history.

(56) References Cited

U.S. PATENT DOCUMENTS

| 5,059,494 A | 10/1991 | Vartanian et al. |
| 6,706,438 B2 * | 3/2004 | Sahoda et al. .................. 429/34 |
| 2002/0022171 A1 * | 2/2002 | Saito et al. ..................... 429/34 |
| 2002/0053469 A1 | 5/2002 | Matsuda |

(Continued)

FOREIGN PATENT DOCUMENTS

DE    40 05 468 A1    8/1991

(Continued)

OTHER PUBLICATIONS

"WordNet Search." WordNet. 5 Nov. 1008. <http://wordnet.princeton.edu/perl/webwn?s=incorporate>.*

*Primary Examiner*—Dah-Wei D Yuan
*Assistant Examiner*—Zachary Best
(74) *Attorney, Agent, or Firm*—Foley & Lardner LLP (57) ABSTRACT

Three ejectors 5, 7, 9 with differences in specification are connected in parallel between a hydrogen storage unit 3 and a fuel cell 1. Respective ejectors 5, 7, 9 allow excess hydrogen, discharged from the fuel cell 1, to pass through a hydrogen recirculating common flow passage 35 and to be recirculated through three recirculation branch flow passages 37, 39, 41. Shut-off mechanisms 13, 15, 19, 21, 25, 27 are disposed at both upstream and downstream sides of the respective ejectors 5, 7, 9, with closing and opening of the shut-off mechanisms located at both the upstream and downstream sides of the respective ejectors 5, 7, 9 permitting the three ejectors 5, 7, 9 to be properly used.

10 Claims, 11 Drawing Sheets

U.S. PATENT DOCUMENTS

| | | |
|---|---|---|
| 2002/0119361 A1 | 8/2002 | Herrmann |
| 2002/0136942 A1 | 9/2002 | Kashiwagi |

FOREIGN PATENT DOCUMENTS

| | | |
|---|---|---|
| DE | 100 45 880 A1 | 9/2002 |
| EP | 0 269 877 A1 | 6/1988 |
| JP | 63-16571 A | 1/1988 |
| JP | 2660097 B2 | 6/1997 |
| JP | 2002-56870 A | 2/2002 |
| JP | 2002-93438 A | 3/2002 |
| WO | WO 91/17578 A1 | 11/1991 |

* cited by examiner

FUEL SUPPLY APPARATUS FOR FUEL CELL

TECHNICAL FIELD

This invention relates to a fuel cell system equipped with ejectors adapted to an excess component, expelled from a fuel cell, of hydrogen supplied to the fuel cell from a hydrogen supply source to be recirculated to the fuel cell.

BACKGROUND ART

With respect to a flow rate of hydrogen to be supplied to a fuel cell, there are many probabilities where a hydrogen stoichiometric ratio (an amount of hydrogen to be introduced/an amount of hydrogen consumed for electric power generation) is ensured to lie at a value greater than 1 (for instance, 1.5), with hydrogen resulting from non-use in reaction being recirculated for the purpose of improving a coefficient of utilization of hydrogen.

When in use of ejectors for such recirculation, although there is a case where a single ejector is suffice, another case exists where two ejectors are switched over and selected for use depending upon the flow rate. But, when using the two ejectors to be switched over, it is required to provide switch over mechanisms and back flow protection mechanisms.

On example where such two ejectors are provided with the use of the switch-over mechanisms and the back flow mechanisms is disclosed in Japanese patent Provisional Publication No. 2002-56870.

DISCLOSURE OF THE INVENTION

By the way, with a related art mechanism mentioned above, in a case where a range (a dynamic range) of hydrogen inlet port rate increases due to an increase in an output of the fuel cell, it is supposed that there is a case where an entire flow rate cannot be covered with the two ejectors. Further, simply, mere provision of three ejectors causes complexity in structure because of a need for the switch-over mechanisms and the back flow protection mechanisms.

Therefore, the present invention has an object to be able to comply with an increase in a hydrogen inlet port rate without causing a complexity in structure.

To achieve the above object, in a fuel cell system equipped with ejectors adapted to allow an excess component, expelled from a fuel cell, of hydrogen supplied to the fuel cell from a hydrogen supply source to be recirculated to the fuel cell, the present invention has a structure wherein more than three ejectors are disposed between the fuel cell and the hydrogen supply source and those, which are in non-use, of the more than three ejectors shut off hydrogen from communicating by shut-off mechanisms.

BEST MODE FOR CARRYING OUT THE INVENTION

Hereinafter, embodiments of the present invention are described in detail with reference to the attached drawings.

Figure 1:
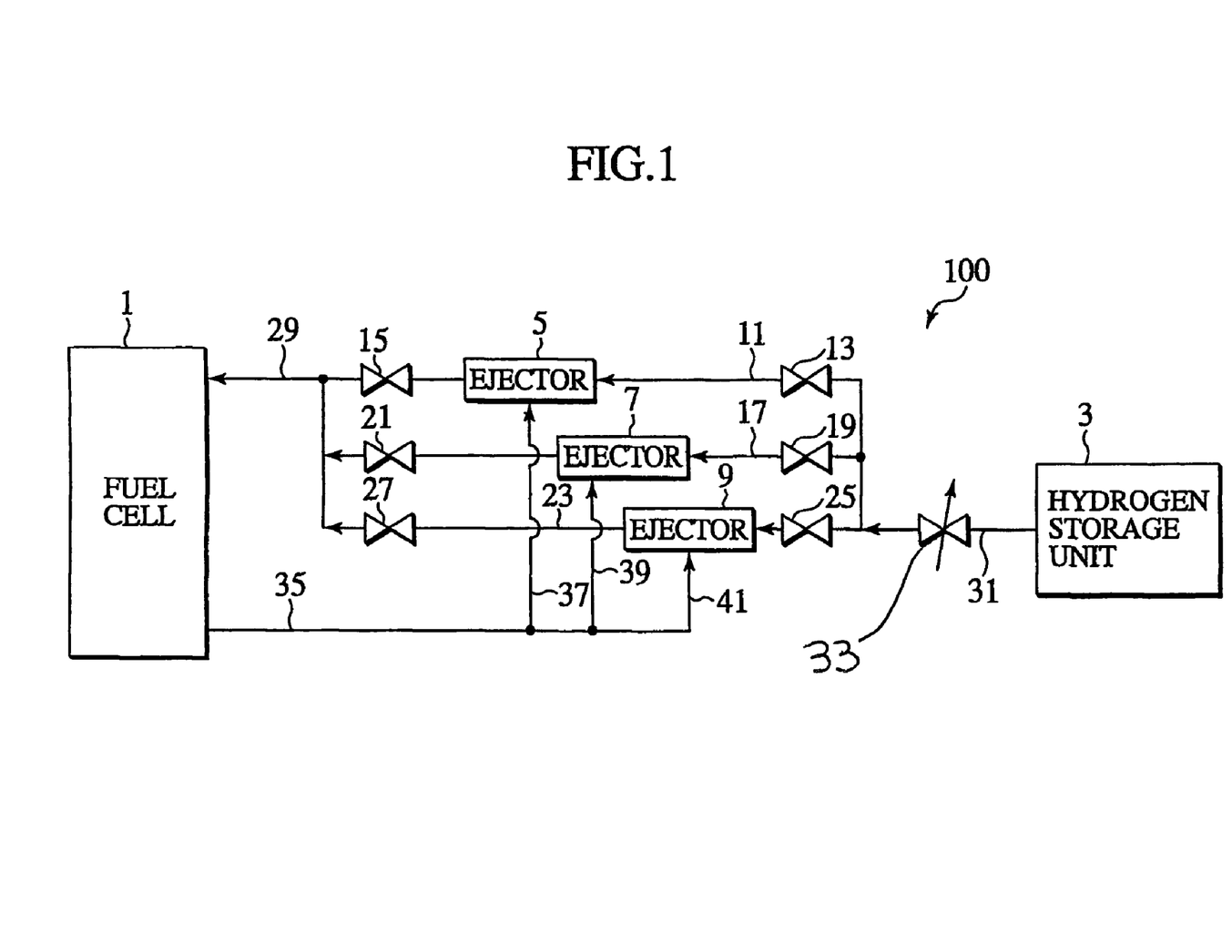
FIG. 1 is an overall structural view of a fuel cell system showing a first embodiment of the present invention.

FIG. 1 is an overall structural view of a fuel cell system of a first embodiment according to the present invention. The fuel cell system 100 is comprised of a fuel cell 1 and a hydrogen storage unit 3, serving as a hydrogen supply source, between which three ejectors 5, 7, 9 are connected in parallel to allow hydrogen in excess thereof, supplied to the fuel cell 1, to be recirculated to the fuel cell 1.

Figure 2:
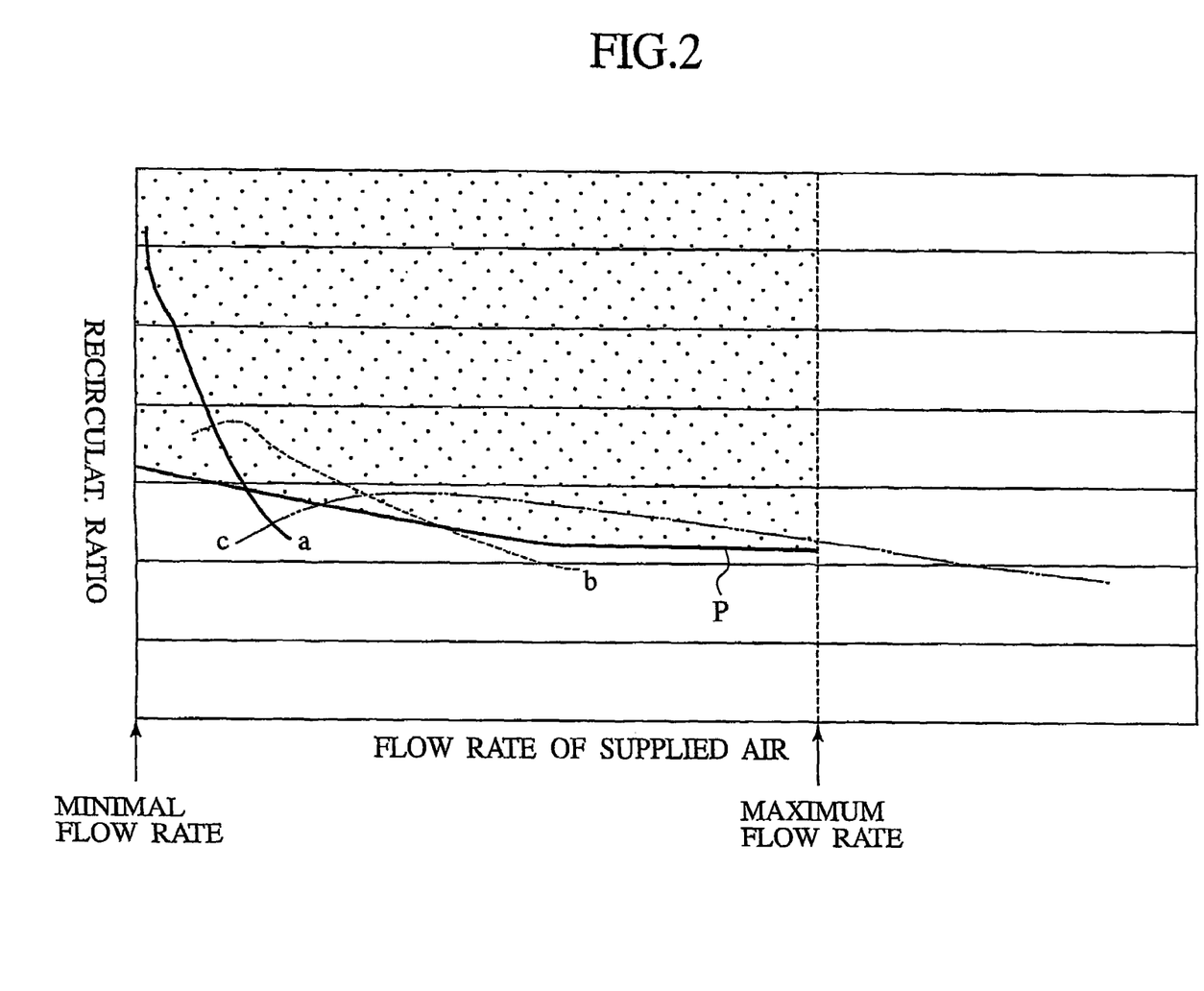
FIG. 2 is a characteristic view of ejectors in the fuel cell system of FIG. 1.

As shown in FIG. 2, the ejectors 5, 7, 9 are so configured as to have relationships, different from one another, in terms of a flow rate of air (with hydrogen being referred to in the presently filed embodiment) to be supplied and a recirculation ratio (ratio of a volume in terms of the flow rate to be supplied). Here, a solid line a corresponds to the ejector 5, a broken line b corresponds to the ejector 7 and a single dot line c corresponds to the 9, with these ejectors being used in combination to obtain a widened range of the flow rate of air to be supplied (in terms of the recirculation ratio) higher than a curve P.

Disposed in a hydrogen inlet port passage 11 at both of upstream and downstream sides between which the ejector 5 is located are shut-off mechanisms 13, 15, and disposed in a hydrogen inlet port passage 17 at both of upstream and downstream sides between which the ejector 7 is located are shut-off mechanisms 19, 21, while disposed in a hydrogen inlet port passage 23 at both of upstream and downstream sides between which the ejector 9 is located are shut-off mechanisms 25, 27.

The respective hydrogen inlet port passages 11, 17, 23 described above are mutually connected in parallel to one another, with downstream ends of these flow passages being connected to the fuel cell 1 through a downstream side common flow passage 29 while upstream ends of the flow passages are connected to the hydrogen storage unit 3 through an upstream side common flow passage 31. And, disposed in the upstream side common flow passage 31 is a pressure regulator mechanism 33 by which a pressure of hydrogen is regulated.

Further, connected to a hydrogen exhaust port of the fuel cell 1 is one end of a hydrogen reccirculating common flow passage 35, the other end of which is diverged into three recirculation branch flow passages 37, 39, 41 which in turn are connected to the ejectors 5, 7, 9, respectively.

With the fuel cell system set forth above, hydrogen fed out from the hydrogen storage unit 3 is regulated in pressure by the pressure regulator mechanism 33, with the shut-off mechanisms 13, 15 associated with the ejector 5, the shut-off mechanisms 19, 21 associated with the ejector 7 and the shut-off mechanisms 25, 27 associated with the ejector 9 being opened or closed depending upon a demanded hydrogen inlet port rate and a demanded flow rate of hydrogen to be recirculated.

By so doing, hydrogen with the pressure being regulated is allowed to flow into one of or plural ones of the three ejectors 5, 7, 9 and supplied into the fuel cell 1 for use in electric power generation. Here, excess hydrogen occurring as a result of non-use for electric power generation is expelled from the fuel cell 1 and passes through the hydrogen reccirculating common flow passage 35 to be sucked into the ejector, with associated shut-off mechanisms remaining open, through either one of the recirculation branch flow passages 37, 39, 41 for recirculation such that recirculated hydrogen is supplied into the fuel cell 1.

With respect to the ejector remaining inoperative, both the shut-off mechanisms disposed at the upstream and downstream of the ejector are shut off to be able to preclude hydrogen from entering the ejector kept in non-use, while enabling to prevent back flow of hydrogen from the downstream side of the ejector, which remains in use, into the ejector in non-use.

With the first embodiment set forth above, since more than three ejectors 5, 7, 9 with differences in specification can be selected merely through the use of the shut-off mechanisms without employing switch-over mechanisms and back flow protection mechanisms, a wide range of flow rate, involving the minimal flow rate and the maximum flow rate, which is hard to be covered with the use of the two ejectors as shown in FIG. 2, can be covered without causing any complexity in structure regardless of a pressure, a temperature, a flow rate and a stoichiometric ratio associated with a hydrogen electrode of the fuel cell 1.

Figure 3A:
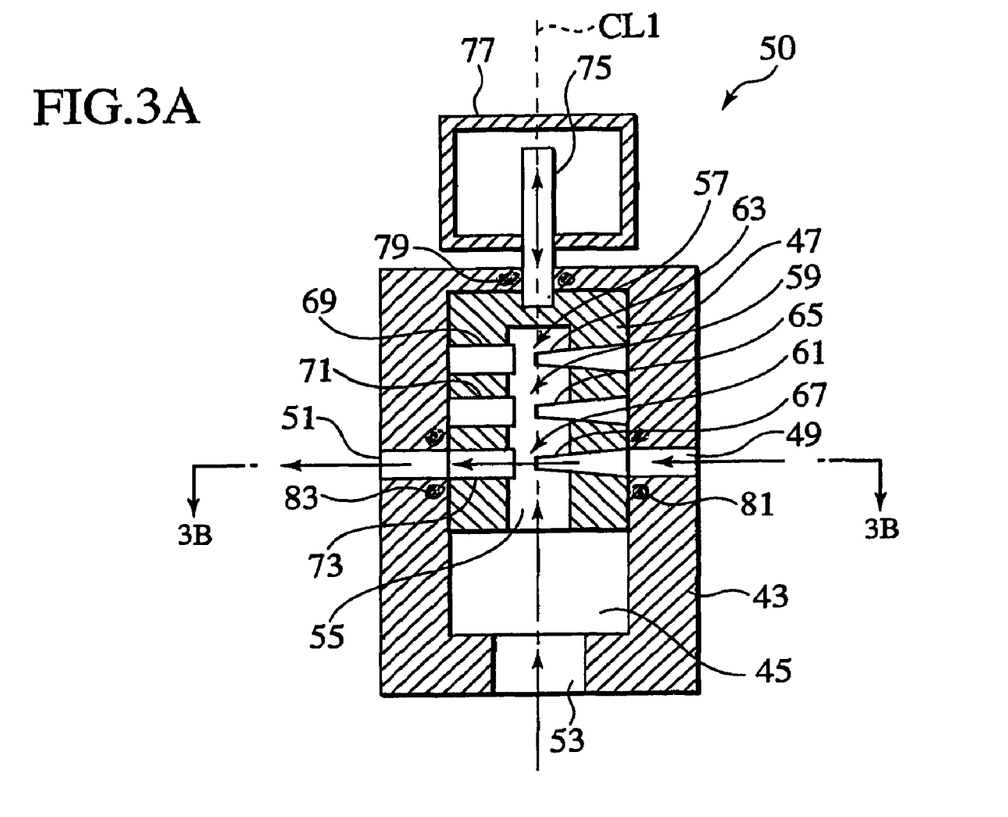
FIG. 3A is a cross sectional view of an ejector unit equipped with three ejector sections for use in a fuel cell system of a second embodiment of the present invention.

FIG. 3A is a cross sectional view of an ejector unit 50 equipped with three ejector sections for use in a fuel cell system of a second embodiment of the present invention. The ejector unit 50 includes a housing 43 of a cubic structure formed with a valve body receiver cavity 45 in which a cylindrical valve body 47 is disposed for sliding movement along a vertically extending axis CL1 in the figure.

Formed in the housing 43 at left and right symmetric positions thereof in a substantially center area along a vertical direction are a hydrogen inlet port 49 and a hydrogen outlet port 51 which are open to the valve body receiver cavity 45. Hydrogen supplied from the hydrogen storage unit, that is not shown, enters the hydrogen inlet port 49 and is discharged from the hydrogen outlet port 51 to be supplied to the fuel cell that is not shown. Also, formed at a lower portion of the housing 43 is a hydrogen recirculation port 53 which communicates with the valve body receiver cavity 45. Excess hydrogen discharged from the fuel cell described above enters the hydrogen recirculation port 53.

The valve body 47 has a central portion formed with a hydrogen recirculation flow passage 55 extending in a vertical direction, with a lower end of the hydrogen recirculation flow passage 55 being open to the valve body receiver cavity 45.

Formed on the above-described valve body 47 along the vertical direction of the hydrogen recirculation flow passage 55, respectively, are three ejector sections 57, 59, 61. The ejector sections 57, 59, 61 are comprised of nozzles 63, 65, 67 formed on the valve body 57 at the right side as viewed in FIG. 3A along the vertical direction, and diffusers 69, 71, 73 formed at positions opposite to the respective nozzles 63, 65, 67.

Here, the above-described respective ejector sections 57, 59, 61 are so configured as to have mutually different relationships, i.e., specifications, in terms of a flow rate of air (hydrogen in the presently filed embodiment) to be supplied and a recirculation ratio, as shown in FIG. 2, like those of the first embodiment set forth above.

And, vertical sliding movement of the valve body 47 allows either one of the respective ejector sections 57, 59, 61 to be selected in a position in compliance with the hydrogen inlet port 49 and the hydrogen outlet port 51, with selected either one of the ejector sections being used for supplying hydrogen to the fuel cell.

Figure 3B:
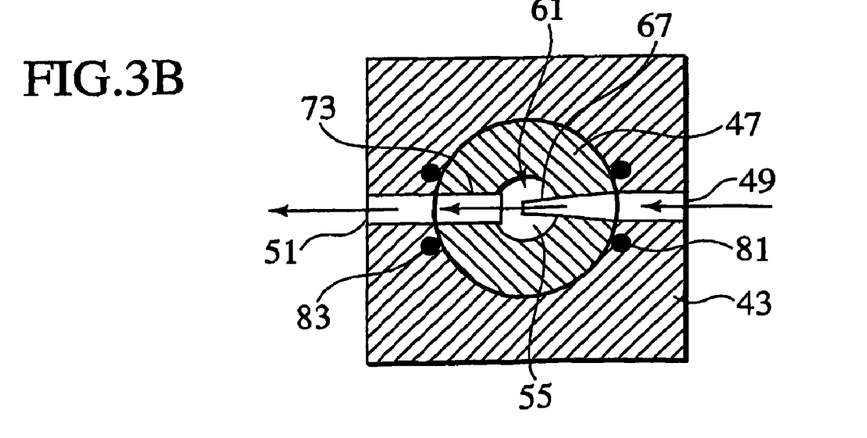
FIG. 3B is a cross sectional view taken on line 3B-3B of FIG. 3A.

FIG. 3A shows a condition in which the valve body 47 is shifted to the uppermost position to allow the lower most ejector section 61 to be effective in use. That is, when this takes place, the nozzle 67 communicates with the hydrogen inlet port 49 and the diffuser 73 communicates with the hydrogen outlet port 51. FIG. 3B is a cross sectional view taken on line 3B-3B of FIG. 3A.

Figure 4:
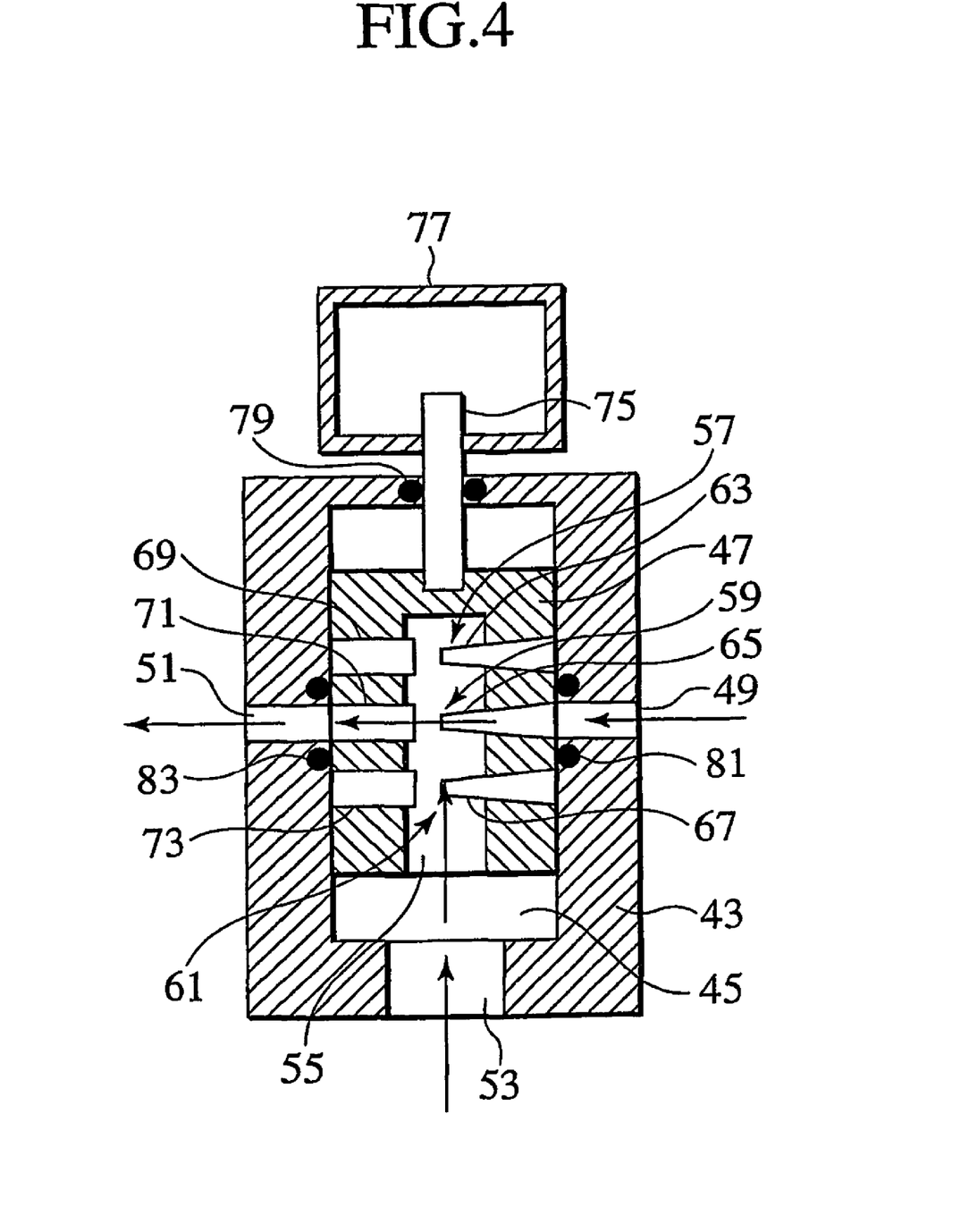
FIG. 4 is a cross sectional view illustrating a condition in which a valve body of FIGS. 3A, 3B is shifted to a vertically central position to allow the other ejector section to be used.

Further, FIG. 4 shows a condition in which the valve body 47 is shifted to a vertically central position to allow the ejector section 59 to be selected. That is, when this takes place, the nozzle 65 communicates with the hydrogen inlet port 49 and the diffuser 71 communicates with the hydrogen outlet port 51.

Connected to an upper end of the valve body 47 is one end (lower end) of a shaft 75, with the other end of the shaft 75 protruding outward from the housing 43 and connected to a direct acting actuator 77. Driving the direct actuating actuator 77 allows the valve body 47 to vertically slide and move.

Disposed between the shaft 75 and the housing 43 which have been described above is a sealing material 79 and, additionally, sealing materials 81, 83 are disposed at respective contacting peripheries between the hydrogen inlet port 49 and the hydrogen outlet port 51, and the valve body 47.

Next, operation of the second embodiment set forth above is described. Let's consider a case where the direct acting actuator 77 is driven to cause the valve body 47 to slide and move to the uppermost position as shown in FIG. 3A to render the ejector section 61 to be effective in use.

As shown in FIG. 3B, in such a case, hydrogen entering the hydrogen inlet port 49 of the housing 43 passes from the nozzle 67 through the hydrogen recirculation flow passage 55 to reach the diffuser 73 whereupon hydrogen ejects from the hydrogen outlet port 51 and is supplied to the fuel cell which is not shown.

When passing through the hydrogen recirculation flow passage 55 and reaches the diffuser 73, hydrogen sucks hydrogen that is discharged from the fuel cell and flows through the hydrogen recirculation port 53 of the housing 43 into the valve body receiver cavity 45, thereby permitting sucked hydrogen to be supplied to the fuel cell together with hydrogen entering from the hydrogen inlet port 49.

With the second embodiment set forth above, since more than three ejectors 57, 59, 61 with differences in specification can be selected through sliding movement of the valve body 47 without the use of the switch-over mechanisms and back flow protection mechanisms, a wide range of flow rate, involving the minimal flow rate and the maximum flow rate, which is hard to be covered with the use of the two ejectors as shown in FIG. 2, can be covered without causing any complexity in structure regardless of a pressure, a temperature, a flow rate and a stoichiometric ratio associated with a hydrogen electrode of the fuel cell 1.

Further, with the second embodiment set forth above, sliding movement of the valve body 47 enables one of the plural ejector sections 57, 59, 61 in the valve body 47 to be selected as an ejector to be used in alignment with the hydrogen inlet port 49 and the hydrogen outlet port 51 disposed in the housing 43. For this reason, location of and switch-over of the plural ejector sections can be achieved in a simple and compact structure and operation.

Furthermore, with the other ejector sections, that are not selected, being displaced from the hydrogen inlet port 49 and the hydrogen outlet port 51 disposed in the housing 43, an automatic shut-off function results in, and no need arises for diverging mechanisms and back flow protecting mechanisms to be separately provided and controlled. Also, with such a structure, no structure for distributing supply gas and recirculated gas to the plural ejector sections and permitting exhaust gases to be converged is required, resulting in a significant advantage in miniaturizations in shape of the component parts.

Moreover, according to the second embodiment, even if either one of the ejector sections 57, 59, 61 provided in a plurality of pieces is selected, a sealing performance can be ensured with respect to the ejector sections in non-use through the use of the sealing materials 79, 81, 83 at three positions and leakage of gas to the ejectors in non-use and back flow of gas can be protected while at the same time a recirculating function can be protected from being degraded and the sealing performance associated with a gap between the housing 43 and the shaft 75 can be ensured, providing a capability of achieving to protect hydrogen from leaking to the outside of the component parts.

Also, while in the second embodiment set forth above the three ejector sections 57, 59, 61 have been provided, it may be structured to have more than two or more than four pieces.

Figure 5A:
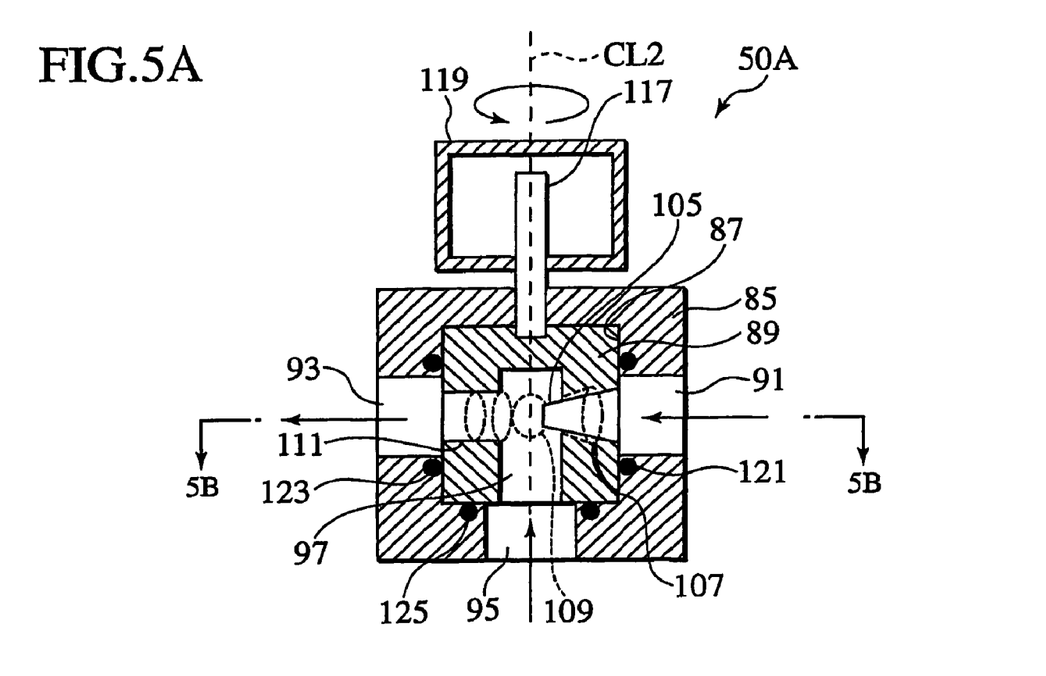
FIG. 5A is a cross sectional view of an ejector unit equipped with three ejector sections for use in a fuel cell system of a third embodiment of the present invention.
Figure 5B:
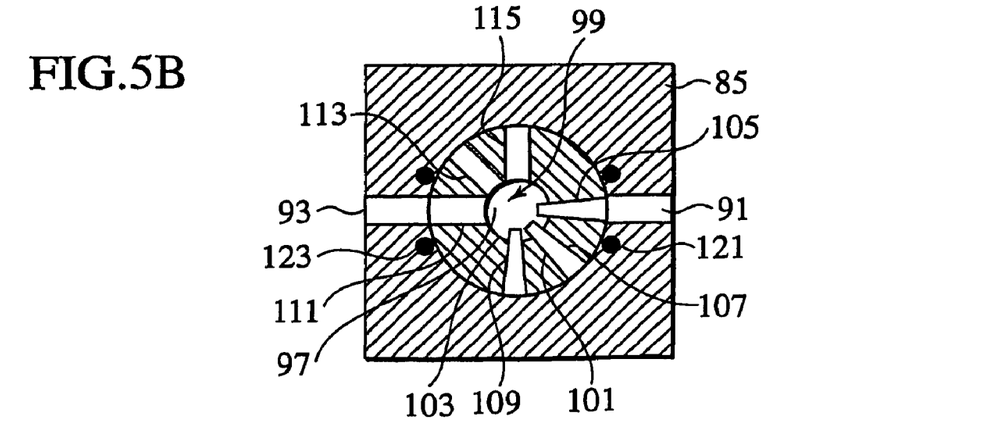
FIG. 5B is a cross sectional view taken on line 5B-5B of FIG. 5A.

FIG. 5A is a cross sectional view of an ejector unit 50A equipped with three ejector sections for use in a fuel cell system of a third embodiment of the present invention. FIG. 5B is a cross sectional view taken on line 5B-5B of FIG. 5A. This ejector unit includes a housing 85 formed in a substantially cubic configuration and having a valve body receiver cavity 87 in which a cylindrical valve body 89 is disposed for rotational movement about a center of a vertically extending axis CL2 in FIG. 5A.

Formed in the housing 85 at left and right symmetric positions thereof in a substantially central area along a vertical direction are a hydrogen inlet port 91 and a hydrogen outlet port 93 which are open to the valve body receiver cavity 87. Hydrogen supplied from the hydrogen storage unit, that is not shown, enters the hydrogen inlet port 91 and is discharged from the hydrogen outlet port 93 and supplied to the fuel cell that is not shown. Also, formed in the housing 85 at a lower portion thereof is a hydrogen recirculation port 95. Excess hydrogen discharged from the fuel cell described above enters the hydrogen recirculation port 95.

The valve body 89 has a central portion formed with a hydrogen recirculation flow passage 97 extending in a vertical direction, with a lower end of the hydrogen recirculation flow passage 97 being open to the hydrogen recirculation part 95.

Formed on the above valve body 89 along a circumferential periphery of the hydrogen recirculation flow passage 97, respectively, are three ejector sections 99, 101, 103. The ejector sections 99, 101, 103 are comprised of nozzles 105, 107, 109 formed in the valve body 89 along the circumferential periphery thereof, and diffusers 111, 113, 115 formed at positions opposite to the respective nozzles 105, 107, 109.

Here, the above-described respective ejector sections 99, 101, 103 are so configured as to have mutually different relationships, i.e., specifications, in terms of a flow rate of air (hydrogen in the presently filed embodiment) to be supplied and a recirculation ratio, as shown in FIG. 2, like those of the first embodiment set forth above.

And, rotational movement of the valve body 89 allows either one of the respective ejector sections 99, 101, 103 to be selected to assume a position in alignment with the hydrogen inlet port 91 and the hydrogen outlet port 93, with such a selected either one of the ejector sections being used for supplying hydrogen to the fuel cell.

FIG. 5B shows a condition in which the valve body 89 is rotationally moved to allow the ejector section 99 to be effective in use. That is, when this takes place, the nozzle 105 communicates with the hydrogen inlet port 91 and the diffuser 111 communicates with the hydrogen outlet port 93.

Figure 6:
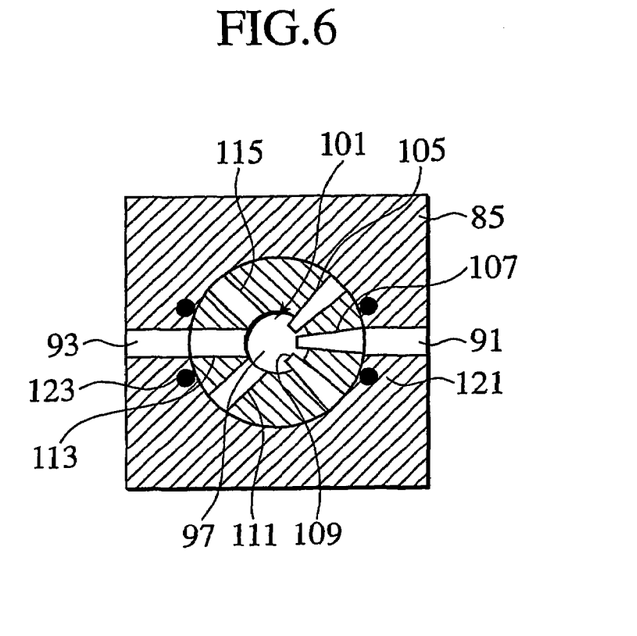
FIG. 6 is a cross sectional view illustrating a condition in which a valve body of FIGS. 5A, 5B is rotationally moved to allow the other ejector section to be used.

FIG. 6 shows a condition under which the valve body 89 is rotationally moved from the condition shown in FIG. 5B counterclockwise in the figure at a given rotational angle to allow the ejector section 101 to be selected. That is, when this takes place, the nozzle 107 communicates with the hydrogen inlet port 91 and the diffuser 113 communicates with the hydrogen outlet port 93.

Connected to an upper end of the valve body 89 is one end (lower end) of a shaft 117, with the other end of the shaft 117 externally protruding outward from the housing 85 to be connected to a rotary actuator 119. That is, driving the rotary actuator 119 allows the valve body 89 to be rotationally moved.

Sealing materials 121, 123 and 125 are disposed at respective peripheral contact areas between the hydrogen inlet port 91, the hydrogen outlet port 93 and the hydrogen recirculation port 95, and the valve body 89.

With the third embodiment set forth above, since the ejector sections can be selected through rotational movement of the valve body 89 without the use of the switch-over mechanisms and the back flow protection mechanisms, the same advantage as that of the second embodiment results in such that a wide range of flow rate, involving the minimal flow rate and the maximum flow rate, which is hard to be covered with the use of the two ejectors as shown in FIG. 2, can be covered without causing any complexity in structure regardless of a pressure, a temperature, a flow rate and a stoichiometric ratio associated with a hydrogen electrode of the fuel cell 1.

Further, with the third embodiment set forth above, since the ejector sections can be selected through rotation of the valve body 89, no margin for movement of the valve body is needed in contrast to the second embodiment, enabling further miniaturization in configuration of the component parts.

Furthermore, while in the third embodiment set forth above, three ejector sections 99, 101, 103 have been provided, a structure with more than two or more than four pieces may be adopted.

Figure 7A:
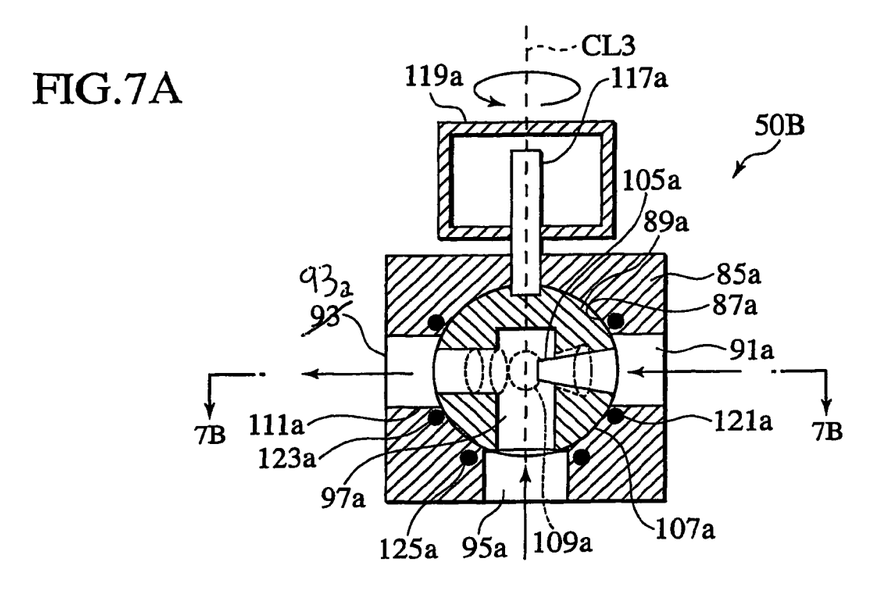
FIG. 7A is a cross sectional view of an ejector unit equipped with three ejector sections for use in a fuel cell system of a fourth embodiment of the present invention.
Figure 7B:
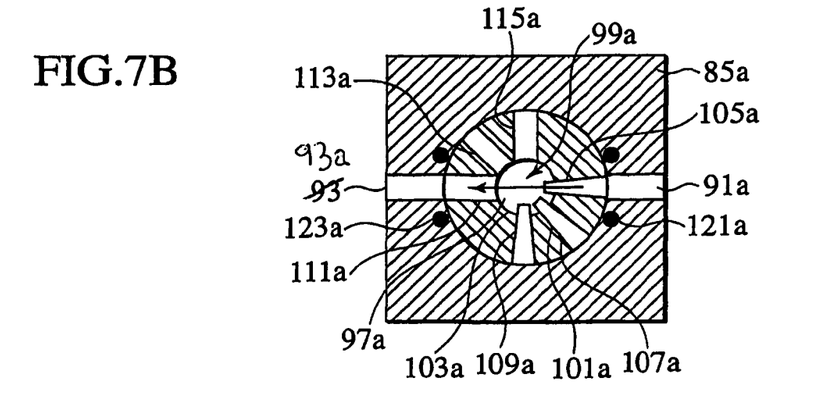
FIG. 7B is a cross sectional view taken on line 7B-7B of FIG. 7A.
Figure 8:
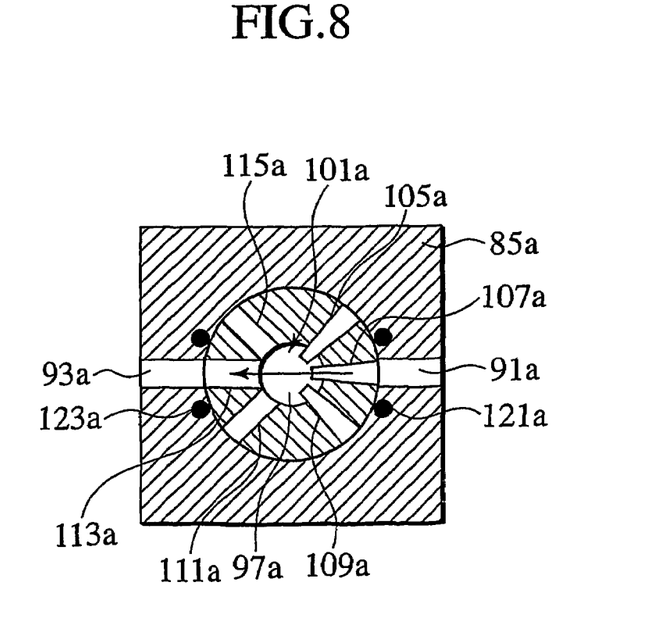
FIG. 8 is a cross sectional view illustrating a condition in which a valve body of FIGS. 7A, 7B is rotationally moved to allow the other ejector section to be used.

FIG. 7A is a cross sectional view of an ejector unit 50B equipped with three ejector sections for use in a fuel cell system of a fourth embodiment of the present invention. FIG. 7B is a cross sectional view taken on line 7B-7B of FIG. 7A. This ejector unit SOB uses a spherical valve body 89a, that is rotationally movable about a center of a vertically extending axis CL3, in place of the cylindrically shaped valve body 89 in the third embodiment shown in FIGS. 5A, 5B and FIG. 6.

The other structure is similar to that of the third embodiment and the same component parts as those of the third embodiment bear the same reference numerals, as used in the third embodiment, with a suffix "a" being added thereto.

With the fourth embodiment set forth above, since the three ejector sections with difference in specifications can be selected through rotational movement of the valve body 89a without the use of the switch-over mechanisms and the back flow protection mechanisms, the same advantage as that of the second embodiment results in such that a wide range of flow rate, involving the minimal flow rate and the maximum flow rate, which is hard to be covered with the use of the two ejectors as shown in FIG. 2, can be covered without causing any complexity in structure regardless of a pressure, a temperature, a flow rate and a stoichiometric ratio associated with a hydrogen electrode of the fuel cell 1.

Further, with the fourth embodiment set forth above, since the ejector sections can be selected through rotation of the spherical valve body 89a, it is possible to achieve further miniaturization in configuration of the component parts than that of the third embodiment wherein the cylindrical valve body 89 is rotated.

Furthermore, while in the fourth embodiment set forth above, three ejector sections 99a, 101a, 103a have been provided, a structure with more than two or more than four pieces may be adopted.

Figure 9A:
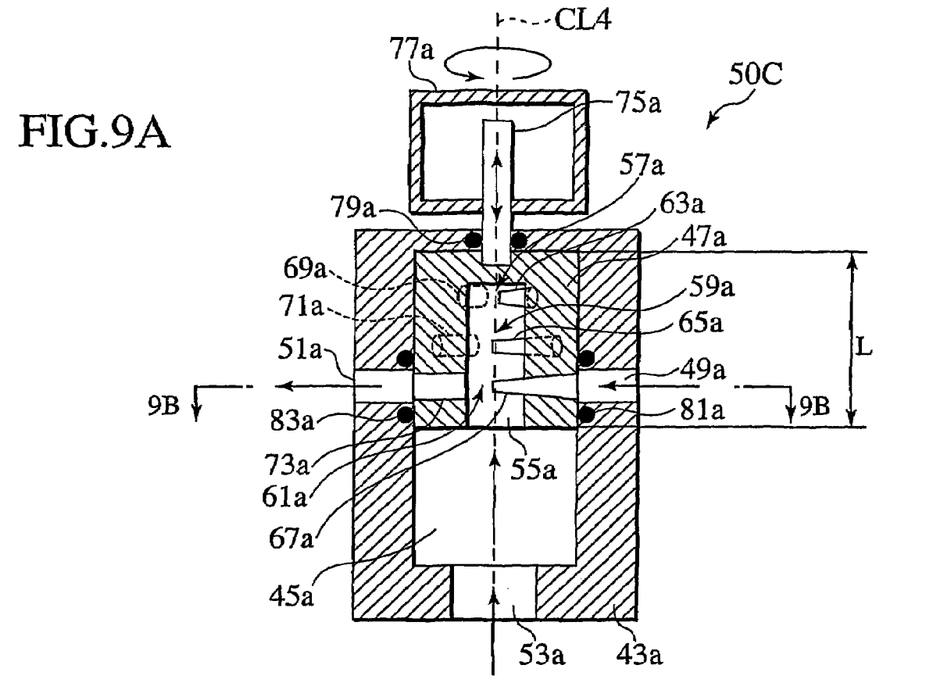
FIG. 9A is a cross sectional view of an ejector unit equipped with three ejector sections for use in a fuel cell system of a fifth embodiment of the present invention.
Figure 9B:
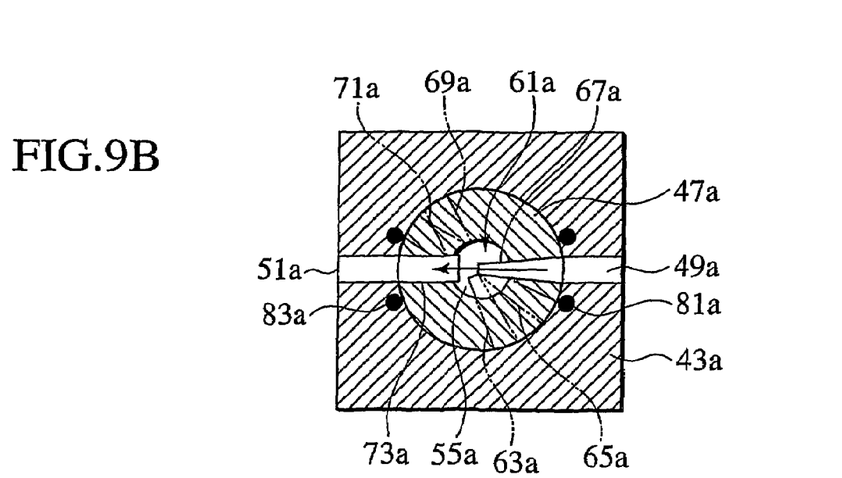
FIG. 9B is a cross sectional view taken on line 9B-9B of FIG. 9A.

FIG. 9A is a cross sectional view of an ejector unit equipped with three ejector sections for use in a fuel cell system of a fifth embodiment of the present invention. FIG. 9B is a cross sectional view taken on line 9B-9B of FIG. 9A. This ejector unit is similar to the second embodiment shown in FIGS. 3A, 3B and FIG. 4 in that a cylindrical valve body 47a is accommodated in a housing 43a.

A point differing from the second embodiment resides in that the above valve body 47a is available for sliding movement in the vertical direction with respect to a central axis CL4 while rotationally movable and three ejector sections 57a, 59a, 61a are formed in a spiral shape along a direction in which the valve body is moved.

Accordingly, an actuator 77a disposed herein serves as a direct acting and rotary actuator that permits sliding movement and rotational movement of the valve body 47a.

The other structure is similar to that of the second embodiment and the same component parts as those of the second embodiment bear the same reference numerals, as used in the second embodiment, with a suffix "a" being added thereto.

With the fifth embodiment set forth above, since the ejector sections 57a, 59a, 61a with difference in specifications can be selected through sliding and rotational movements of the valve body 47a without the use of the switch-over mechanisms and the back flow protection mechanisms, the same advantage as that of the second embodiment results in such that a wide range of flow rate, involving the minimal flow rate and the maximum flow rate, which is hard to be covered with the use of the two ejectors as shown in FIG. 2, can be covered without causing any complexity in structure regardless of a pressure, a temperature, a flow rate and a stoichiometric ratio associated with a hydrogen electrode of the fuel cell 1.

Also, with the fifth embodiment, since the three ejector sections are disposed on the valve body 47a in the spiral configuration, in a case where the same number of ejector sections are employed, a vertical length of the valve body 47a can be made shorter than that of the valve body 47 shown in FIGS. 3A, 3B, thereby enabling miniaturization of the valve body 47a to be achieved.

Furthermore, while in the fifth embodiment set forth above, three ejector sections 57a, 59a, 61a have been provided, a structure with more than two or more than four pieces may be adopted.

Figure 10A:
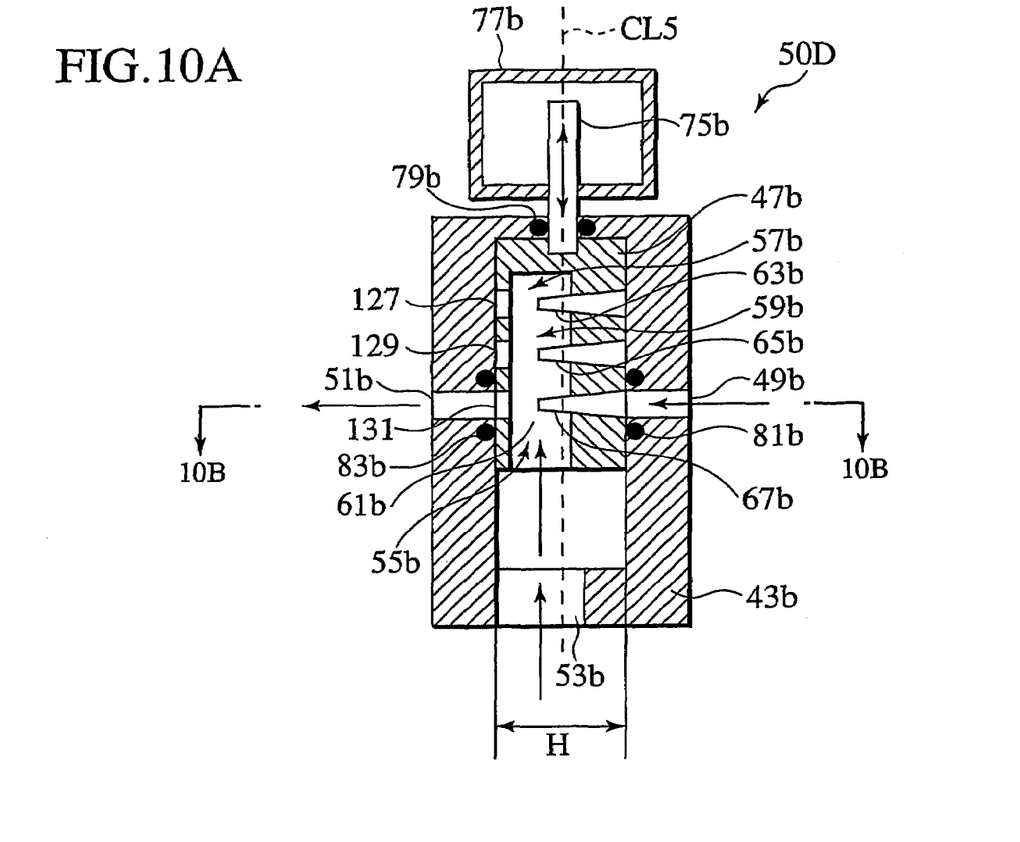
FIG. 10A is a cross sectional view of an ejector unit equipped with three ejector sections for use in a fuel cell system of a sixth embodiment of the present invention.
Figure 10B:
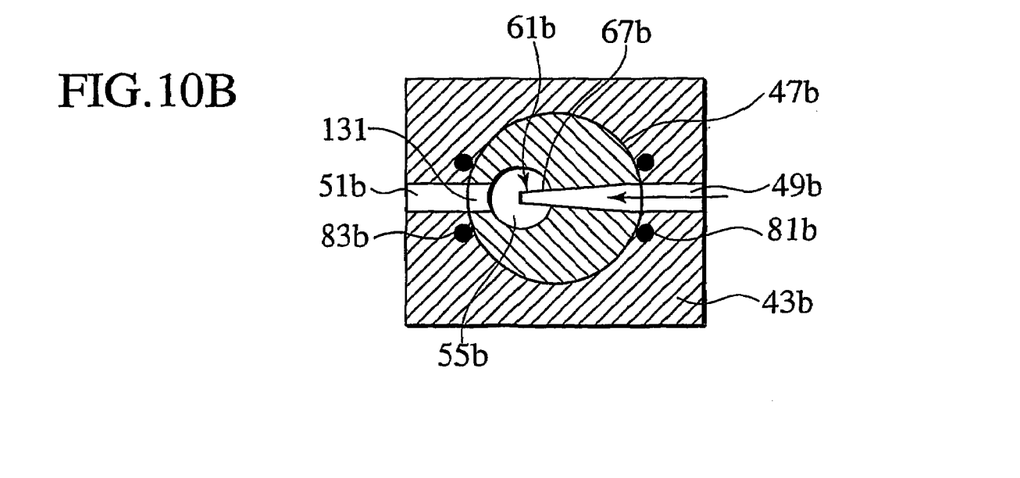
FIG. 10B is a cross sectional view taken on line 10B-10B of FIG. 10A.

FIG. 10A is a cross sectional view of an ejector unit equipped with three ejector sections for use in a fuel cell system of a sixth embodiment of the present invention. FIG. 10B is a cross sectional view taken on line 10B-10B of FIG. 10A. This ejector unit is similar to the second embodiment shown in FIGS. 3A, 3B and FIG. 4 in that a cylindrical valve body 47b is accommodated in a housing 43b.

A point differing from the second embodiment resides in that the a hydrogen outlet port 51b is used as a common diffuser for three ejector sections 57b, 59b, 61b.

For this reason, a hydrogen recirculation flow passage 55b is formed in the valve body 47b at a position closer to the hydrogen outlet port 51b with respect to a central axis CL5 extending in a vertical direction of the valve body 47b, and communication apertures 127, 129, 131 are formed in the valve body 47b at positions opposite to respective nozzles 63b, 65b, 67b, respectively.

That is, as shown in FIG. 10A, under a condition where the valve body 47b is moved to the uppermost position in the figure to render the lowermost ejector section 61b to remain in use, the communication aperture 131 communicates with the hydrogen outlet port 51b.

The other structure is similar to that of the second embodiment and the same component parts as those of the second embodiment bear the same reference numerals, as used in the second embodiment, with a suffix "b" being added thereto.

With the sixth embodiment set forth above, since the three ejector sections 57b, 59b, 61b with difference in specifications can be selected through sliding movement of the valve body 47b without the use of the switch-over mechanisms and the back flow protection mechanisms, the same advantage as that of the second embodiment results in such that a wide range of flow rate, involving the minimal flow rate and the maximum flow rate, which is hard to be covered with the use of the two ejectors as shown in FIG. 2, can be covered without causing any complexity in structure regardless of a pressure, a temperature, a flow rate and a stoichiometric ratio associated with a hydrogen electrode of the fuel cell 1.

Also, by providing the diffuser formed in the housing 43b to be common to the three ejector sections 57b, 59b, 61b without forming the diffusers in the valve body 47b, a lateral width H of the valve body 47b in FIG. 10A can be shortened to achieve miniaturization and light weight, resulting in a decrease in an actuating capacity of an actuator 77b.

Furthermore, while in the sixth embodiment set forth above, three ejector sections 57b, 59b, 61b have been provided, a structure with more than two or more than four pieces may be adopted.

Further, the structure, wherein the diffuser is formed in the housing 43b to be common to the three ejector sections 57b, 59b, 61b without forming the diffusers in the valve body 47b, can be applied to the third embodiment shown in FIGS. 5A, 5B, the fourth embodiment shown in FIGS. 7A, 7B and the fifth embodiment shown in FIGS. 9A, 9B, respectively.

Figure 11:
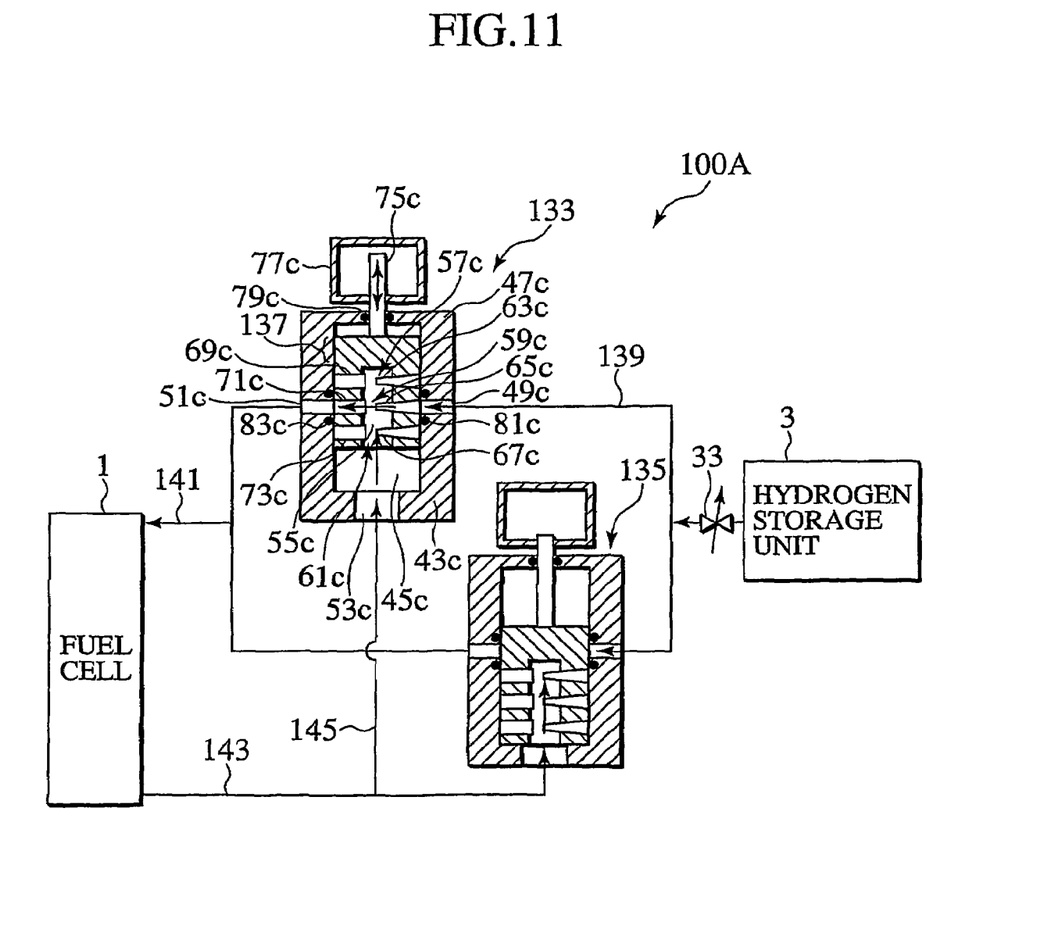
FIG. 11 is an overall structural view of a fuel cell system of a seventh embodiment of the present invention.

FIG. 11 is an overall structural view of a fuel cell system of a seventh embodiment according to the present invention.

This fuel cell system is comprised of two ejector units 133, 135 which are connected between the fuel cell 1 and the hydrogen storage unit 3 in parallel.

The two ejector units 133, 135 have the same structures which are mutually identical and, so, a description is made of only one ejector 133. This ejector 133 is similar in structure to that of the second embodiment shown in FIGS. 3A, 3B and FIG. 4 in that a cylindrical valve body 47c is accommodated in a housing 43c.

A point differing from the second embodiment resides in that a shut-off portion 137 is formed on the valve body 47c at an upper area thereof, in the figure, where no ejector section is provided. The other structure of the ejector unit 133 is similar to the second embodiment and the same component parts as those of the second embodiment bear the same reference numerals, as used in the second embodiment, with a suffix "c" being added thereto.

While the ejector unit 133 shown in FIG. 11 has been illustrated to remain under a condition wherein selection is made of the ejector section 59c formed at a vertically center, an attempt to allow the valve body 47c to slide and move downward from the above condition of the ejector unit 133 to assume the lowermost end permits the hydrogen inlet port 49c and the hydrogen outlet port 51c to be brought into alignment with the position that corresponds the shut-off portion 137 at the upper portion of the valve body 49c for shut-off.

As such, hydrogen delivered from the hydrogen storage unit 3 passes through the pressure regulator mechanism 33 and flows through a hydrogen inlet port passage 139 to the hydrogen inlet port 49c of the ejector unit 133 whereupon hydrogen inlet ports through the selected central ejector section 59c and is ejected to the outside through the hydrogen outlet port 51c.

And, such ejecting hydrogen passes through a downstream side common flow passage 141 and is taken into the fuel cell 1. Hydrogen in excess of, as a result of non-availability for electric power generation, is sucked and recirculated through a hydrogen reccirculating common flow passage 143, the ejector unit 133 and an associated recirculation branch flow passage 145, with such recirculated hydrogen being also supplied to the fuel cell 1.

In the meantime, the ejector unit 135 that remains in a shut-off condition rendered by the shut-off portion 137 of the valve body 47c is not supplied with hydrogen from the hydrogen storage unit 3 and, accordingly, no suction of the ejector takes place for hydrogen in excess of, flowing out from the fuel cell 1 to the hydrogen reccirculating common flow passage 143.

With the seventh embodiment set forth above, the presence of movement of the valve body 47c to allow the shut-off portion 137 to be selected enables the hydrogen inlet port passages at fore and aft of the ejector unit to be shut off and, in the presence of the unit that remains in non-use among a plurality of ejector units which are provided, there is no need for separately providing a shut-off mechanism.

In such a case, when operating a system wherein a plurality of ejector units are located to permit inclusion of a further increased number of ejectors, in view of a system structure, which are switched over so as to ensure an optimum flow rate range, a selection range of the ejectors can be expanded and the system can be simplified, thereby enabling miniaturization.

Figure 12:
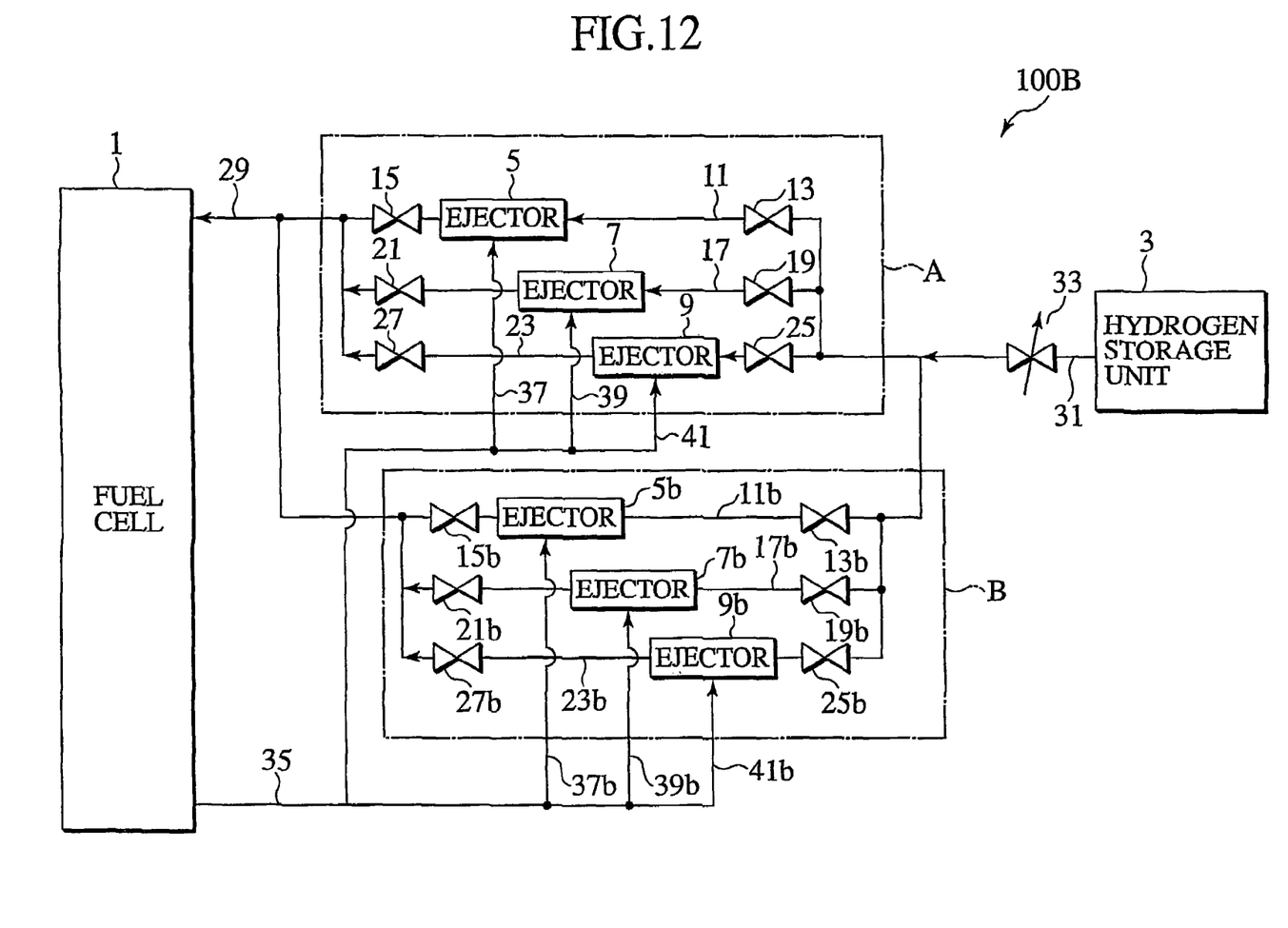
FIG. 12 is an overall structural view of a fuel cell system of an eighth embodiment of the present invention.

FIG. 12 is an overall structural view of a fuel cell system of an eighth embodiment according to the present invention. In the fuel cell system, suppose that a unit A includes a unit comprised of the three ejector sections 5, 7, 9, the shut-off mechanisms 13, 15, the shut-off mechanism 19, 21 and the shut-off mechanisms 25, 27 of the first embodiment shown in FIG. 1 set forth above, a unit B with the same structure as the unit A is connected in parallel to the unit A.

Also, the same component parts of the unit B as those of the unit A bear the reference numerals, used in the unit A, with a suffix "b" added thereto. The respective ejectors 5b, 7b, 9b of the unit B may have the same specifications as those of the ejectors 5, 7, 9 of the unit A, or all of the six ejectors may have different specifications.

With the eighth embodiment set forth above, it is possible to select a further large number of ejectors or to combine these ejectors, resulting in a capability further expansion in a selection range of an optimum flow rate range.

INDUSTRIAL APPLICABILITY

According to the present invention described above, since more than three ejectors with differences in specification can be selected merely through the use of the shut-off mechanisms without employing switch-over mechanisms and back flow protection mechanisms, a wide range of flow rate, involving the minimal flow rate and the maximum flow rate, which is hard to be covered with the use of the two ejectors, can be covered without causing any complexity in structure regardless of a pressure, a temperature, a flow rate and a stoichiometric ratio associated with a hydrogen electrode of the fuel cell.

The entire content of Japanese Application No. P2002-306852 with a filing date of Oct. 22, 2002 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

The invention claimed is:

1. A fuel cell system comprising:
   a fuel cell;
   a hydrogen supply source supplying hydrogen to the fuel cell;
   an ejector unit equipped with more than three ejector sections disposed between the fuel cell and the hydrogen supply source and permitting excess hydrogen, expelled from the fuel cell, among hydrogen supplied to the fuel cell from the hydrogen supply source to be recirculated to the fuel cell; and
   a shut-off mechanism selectively shutting off hydrogen communicating through at least one of the ejector sections, wherein
   the ejector unit comprises a housing formed with a hydrogen inlet port, a hydrogen outlet port and a hydrogen recirculation port, and a valve body moveably received in the housing and incorporating the ejector sections, wherein
   movement of the valve body allows any one of the ejector sections to be selected, wherein
   the valve body comprises a hydrogen recirculation flow passage communicating with the hydrogen recirculation port, wherein the valve body has a cylindrical shape and received in the housing for a sliding and moving capability along an axis of the valve body, and wherein
   the ejector sections are disposed in the valve body in communication with the hydrogen recirculation flow passage along a direction in which the valve body slides such that sliding movement of the valve body effectuated in the housing allows either one of the ejector sections to be brought into communication with the hydrogen inlet port and the hydrogen outlet port of the housing.

2. A fuel cell system comprising:

a fuel cell;

a hydrogen supply source supplying hydrogen to the fuel cell;

an ejector unit equipped with more than three ejector sections disposed between the fuel cell and the hydrogen supply source and permitting excess hydrogen, expelled from the fuel cell, among hydrogen supplied to the fuel cell from the hydrogen supply source to be recirculated to the fuel cell; and a shut-off mechanism selectively shutting off hydrogen communicating through at least one of the ejector sections, wherein the ejector unit comprises a housing formed with a hydrogen inlet port, a hydrogen outlet port and a hydrogen recirculation port, and a valve body moveably received in the housing and incorporating the ejector sections, wherein movement of the valve body allows any one of the ejector sections to be selected, wherein the valve body comprises a hydrogen recirculation flow passage communicating with the hydrogen recirculation port, wherein the valve body has a cylindrical shape and received in the housing for a rotationally moving capability about an axis of the valve body, and wherein the ejector sections are disposed in the valve body in communication with the hydrogen recirculation flow passage along a direction in which the valve body rotationally moves such that rotational movement of the valve body effectuated in the housing allows any one of the ejector sections to be brought into communication with the hydrogen inlet port and the hydrogen outlet port of the housing.

3. A fuel cell system comprising:

a fuel cell;

a hydrogen supply source supplying hydrogen to the fuel cell;

an ejector unit equipped with more than three ejector sections disposed between the fuel cell and the hydrogen supply source and permitting excess hydrogen, expelled from the fuel cell, among hydrogen supplied to the fuel cell from the hydrogen supply source to be recirculated to the fuel cell; and a shut-off mechanism selectively shutting off hydrogen communicating through at least one of the ejector sections, wherein the ejector unit comprises a housing formed with a hydrogen inlet port, a hydrogen outlet port and a hydrogen recirculation port, and a valve body moveably received in the housing and incorporating the ejector sections, wherein movement of the valve body allows any one of the ejector sections to be selected, wherein the valve body comprises a hydrogen recirculation flow passage communicating with the hydrogen recirculation port, wherein the valve body has a spherical shape and received in the housing for a rotationally moving capability about a central axis of the valve body, and wherein the ejector sections are disposed in the valve body in communication with the hydrogen recirculation flow passage along a direction in which the valve body rotationally moves such that rotational movement of the valve body effectuated in the housing allows any one of the ejector sections to be brought into communication with the hydrogen inlet port and the hydrogen outlet port of the housing.

4. A fuel cell system comprising:

a fuel cell;

a hydrogen supply source supplying hydrogen to the fuel cell;

an ejector unit equipped with more than three ejector sections disposed between the fuel cell and the hydrogen supply source and permitting excess hydrogen, expelled from the fuel cell, among hydrogen supplied to the fuel cell from the hydrogen supply source to be recirculated to the fuel cell; and a shut-off mechanism selectively shutting off hydrogen communicating through at least one of the ejector sections, wherein the ejector unit comprises a housing formed with a hydrogen inlet port, a hydrogen outlet port and a hydrogen recirculation port, and a valve body moveably received in the housing and incorporating the ejector sections, wherein movement of the valve body allows any one of the ejector sections to be selected, wherein the valve body comprises a hydrogen recirculation flow passage communicating with the hydrogen recirculation port, wherein the valve body has a cylindrical shape and received in the housing to rotationally move about an axis of the valve body while sliding along the axis thereof, and wherein the ejector sections are disposed in the valve body on a spiral configuration in communication with the hydrogen recirculation flow passage along a direction in which the valve body rotationally moves while in sliding movement such that rotational movement of the valve body while in sliding movement effectuated in the housing allows either one of the ejector sections to be brought into communication with the hydrogen inlet port and the hydrogen outlet port of the housing.

5. A fuel cell system comprising:

a fuel cell;

a hydrogen supply source supplying hydrogen to the fuel cell;

an ejector unit equipped with more than three ejector sections disposed between the fuel cell and the hydrogen supply source and permitting excess hydrogen, expelled from the fuel cell, among hydrogen supplied to the fuel cell from the hydrogen supply source to be recirculated to the fuel cell; and a shut-off mechanism selectively shutting off hydrogen communicating through at least one of the ejector sections, wherein the ejector unit comprises a housing formed with a hydrogen inlet port, a hydrogen outlet port and a hydrogen recirculation port, and a valve body moveably received in the housing and incorporating the ejector sections, wherein movement of the valve body allows any one of the ejector sections to be selected, wherein the valve body comprises a shut-off portion to shut off the hydrogen inlet port and the hydrogen outlet port during movement thereof.

6. The fuel cell system according to claim 5, wherein the housing comprises a diffuser commonly used for the ejector sections.

7. The fuel cell system according to claim 5, further comprising:

a shaft having one end connected to the valve body;

an actuator connected to the other end of the shaft at an outside of the housing;

a first sealing material disposed between the shaft and the housing;

second sealing materials disposed at respective contacting peripheries between the hydrogen inlet port and the hydrogen outlet port, and the valve body.

8. The fuel cell system according to claim 5, further comprising:

a sealing material disposed at respective contacting peripheries between the hydrogen inlet port, the hydrogen outlet port and the hydrogen recirculation port and the valve body.

9. A fuel cell system comprising:

a fuel cell;

a hydrogen supply source supplying hydrogen to the fuel cell;

ejector means equipped with more than three ejector sections disposed between the fuel cell and the hydrogen supply source and permitting excess hydrogen, expelled from the fuel cell, among hydrogen supplied to the fuel cell from the hydrogen supply source to be recirculated to the fuel cell; and shut-off means for selectively shutting off hydrogen communicating through at least one of the ejector sections, wherein the ejector means comprises a housing formed with a hydrogen inlet port, a hydrogen outlet port and a hydrogen recirculation port, and a valve body moveably received in the housing and incorporating the ejector sections, wherein movement of the valve body allows any one of the ejector sections to be selected, wherein the valve body comprises a shut-off portion to shut off the hydrogen inlet port and the hydrogen outlet port during movement thereof.

10. A method of controlling a fuel cell system, the method comprising:

preparing a fuel cell;

preparing a hydrogen supply source to supply hydrogen to the fuel cell;

preparing a plurality of ejectors disposed between the fuel cell and the hydrogen supply source;

supplying hydrogen to the fuel cell for electric power generation;

expelling excess hydrogen from the fuel cell as a result of non-use for the electric power generation; and selectively shutting off the plurality of ejectors depending on a demanded parameter to allow the excess hydrogen, expelled from the fuel cell, to be recirculated thereto through at least a selected one of the plurality of ejectors, wherein the plurality of ejectors comprise an ejector unit, the ejector unit comprising a housing formed with a hydrogen inlet port, a hydrogen outlet port and a hydrogen recirculation port, and a valve body moveably received in the housing and incorporating the ejectors, wherein the valve body comprises a shut-off portion to shut off the hydrogen inlet port and the hydrogen outlet port during movement thereof, wherein the selectively shutting off the plurality of ejectors comprises moving the valve body to select the shut-off portion of the housing thus shutting off corresponding ejectors.

* * * * *